US011393146B2

(12) United States Patent
Kaplan

(10) Patent No.: US 11,393,146 B2
(45) Date of Patent: *Jul. 19, 2022

(54) SYSTEMS AND METHODS FOR IMPROVING THE READABILITY OF CONTENT

(71) Applicant: Focus Reading Technology Inc., Armonk, NY (US)

(72) Inventor: Howard J. Kaplan, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/113,930

(22) Filed: Dec. 7, 2020

(65) Prior Publication Data

US 2021/0090313 A1 Mar. 25, 2021

Related U.S. Application Data

(63) Continuation of application No. 16/015,458, filed on Jun. 22, 2018, now Pat. No. 10,861,207, which is a continuation of application No. 15/822,911, filed on Nov. 27, 2017, now Pat. No. 10,008,018, which is a (Continued)

(51) Int. Cl.
*G09G 5/00* (2006.01)
*G06T 11/60* (2006.01)
*G06F 3/0485* (2022.01)
*G09B 21/00* (2006.01)
*G06F 3/0482* (2013.01)
*G06F 3/147* (2006.01)
*G09G 5/26* (2006.01)
*G09G 5/34* (2006.01)

(52) U.S. Cl.
CPC ............ *G06T 11/60* (2013.01); *G06F 3/0482* (2013.01); *G06F 3/0485* (2013.01); *G09B 21/008* (2013.01); *G09G 5/00* (2013.01); *G06F 3/147* (2013.01); *G09G 5/26* (2013.01); *G09G 5/343* (2013.01); *G09G 2340/14* (2013.01); *G09G 2380/14* (2013.01)

(58) Field of Classification Search
CPC ...................... G06F 3/0485; G09G 2380/14
See application file for complete search history.

(56) References Cited

U.S. PATENT DOCUMENTS

| 6,131,047 A | 10/2000 | Hayes, Jr |
| 6,147,670 A | 11/2000 | Rossmann |
| 6,154,757 A | 11/2000 | Krause |

(Continued)

OTHER PUBLICATIONS

Ai, Haiyang and Lu, Xiaofei (2010). "A web-based system for automatic measurement of lexical complexity," Paper presented at the 27th Annual Symposium of the Computer-Assisted Language Consortium (CALICO-10). Amherst, MA. Jun. 8-12, 2010.

(Continued)

*Primary Examiner* — Charles Tseng
(74) *Attorney, Agent, or Firm* — Kim IP Law Group LLC

(57) ABSTRACT

Systems and methods are disclosed for improving readability of content wherein content is organized into segments that are each displayed on a respective row on a display device. Each segment is made up of characters such as letters and punctuation. The text in a particular row, the reading row, on the display device is displayed differently than the text in the other rows. Each row is consecutively displayed in the reading row until the user has seen each segment of the content presented in the reading row. Users are able to configure the display of the reading row text and text in other rows independently.

1 Claim, 9 Drawing Sheets

Related U.S. Application Data continuation of application No. 14/727,433, filed on Jun. 1, 2015, now Pat. No. 9,858,695.

(60) Provisional application No. 62/005,695, filed on May 30, 2014.

(56) References Cited

U.S. PATENT DOCUMENTS

| | | |
|---|---|---|
| 7,075,512 B1 | 7/2006 | Fabre |
| 2007/0229898 A1 | 10/2007 | Tomaru |
| 2009/0182824 A1 | 7/2009 | Haynes |
| 2010/0315359 A1 | 12/2010 | Seong |
| 2011/0106970 A1 | 5/2011 | Song |

OTHER PUBLICATIONS

Izgi, U., Seker, Burcu Sezginsoy; Comparing Different Readability Formulas on the Examples of Science-Technology and Social Science Textbooks. V. 46, 2012, pp. 178-182 4th World Conference on Educational Sciences (WCES-2012) 02-05; Feb. 2012, Barcelona, Spain.

SYSTEMS AND METHODS FOR IMPROVING THE READABILITY OF CONTENT

CROSS-REFERENCE TO RELATED APPLICATIONS

This application is a continuation of U.S. patent application Ser. No. 16/015,458, filed Jun. 22, 2018, entitled "Systems and Methods for Improving the Readability of Content," which is a continuation of U.S. patent application Ser. No. 15/822,911, filed Nov. 27, 2017, entitled "Systems and Methods for Improving the Readability of Content," which is a continuation of U.S. patent application Ser. No. 14/727,433, filed Jun. 1, 2015, entitled "Systems and Methods for Improving the Readability of Content," which claims priority under 35 U.S.C. § 119(e) to U.S. Provisional Patent Application No. 62/005,695, filed May 30, 2014, entitled "System and Method for Assisting Visually-Impaired Users to View Visual Content," the disclosures of each of which are hereby incorporated by reference in their entirety.

COPYRIGHT NOTICE

A portion of the disclosure of this patent document contains material which is or may be subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The subject application relates generally to systems and methods for displaying content on a display device, such as, but not limited to, the display device of an e-reader, a phone, a computer, or the like. In particular, the subject application relates to systems and methods for assisting visually impaired readers to take in and process content.

In addition to traditional paper reading matter such as books, magazines, etc., many readers use electronic devices such as e-readers, tablet computers, smart phones, personal computers, notebooks, and similar devices to consume content such as reading matter. Such devices typically provide the text of content on a display device in a form that makes it appear generally similar to the form that text of content would be provided on a page in a traditional book depending upon the settings of the device and/or application being executed by the device. For example, the words may be arranged in the same manner in which words are found on one page of a traditional book. In particular, there are a plurality of lines of text on the display of a page and those lines are laid out from the top of the page to the bottom of the page. Alternatively, for example, the text may be laid out in a manner that depicts two pages of the book, a right page and a left page, as would be seen by the reader of a physical book.

The community of people ("readers") who read books on electronic devices is a large one. While many people are able to easily read the text of content as displayed on a book or on such a display device, certain people have difficulty reading content as it is typically laid out on a page of a traditional book. In some cases, readers suffer from visual dysfunction that distorts their response to information received from the central versus the peripheral parts of their visual field. Such readers may be characterized by a measurement of their periphery-to-center ratio ("PCR".) For such readers, the reading experience can be improved by providing an interface that accentuates words in the center of a reader's visual field relative to words on the periphery of the reader's visual field.

Others who benefit from an interface that provides improved readability of content include those who suffer from other disabilities that detract from their ability to read efficiently. For example, some individuals suffer from difficulties that limit their ability to focus on text on a page (such as eye difficulties or tremors of the body) or that limits their ability to use their hands to turn pages or control an electronic device (such as paralysis). Those individuals benefit from an interface that provides automated text presentation and that eases the difficulties of focusing on text.

BRIEF SUMMARY

In accordance with a first embodiment, the subject application provides a computer readable medium storing instructions which when executed by a processor improve the readability of content on a display device. The instructions include organizing the content into a plurality of segments. The instructions further provide for selecting a first of the plurality of segments to be a first reading segment and selecting others of the plurality of segments to be first background segments. In accordance with the instructions, the processor displays a pane on the display device, the pane configured as a plurality of rows, each row configured to display characters, wherein a first row of the plurality of rows is a reading row and each other row is a background row. The instructions then provide for displaying the first reading segment according to a first readability parameter in the location of the reading row and displaying each first background segment according to a second readability parameter in the location of a respective background row. Upon receiving a transition prompt, the processor follows the instructions in selecting a second one of the plurality of segments to be a second reading segment and selecting others of the plurality of segments to be second background segments, displaying the second reading segment according to a first readability parameter in the location of the reading row, and displaying each second background segment according to a second readability parameter in the location of a respective background row.

In accordance with a second embodiment, the subject application provides an apparatus for improving the readability of a content, including an input device, a display device, a processor, and a program having executable instructions stored in the memory and configured to be executed by the processor. The program includes instructions for organizing the content into a plurality of segments, selecting a first of the plurality of segments to be a first reading segment and selecting others of the plurality of segments to be first background segments, and displaying a pane on the display device, the pane configured as a plurality of rows, each row configured to display characters, wherein a first row of the plurality of rows is a reading row and each other row is a background row. The instructions further provide for displaying the first reading segment according to a first readability parameter in the location of the reading row, displaying each first background segment according to a second readability parameter in the location of a respective background row, and upon receiving a transition prompt, selecting a second one of the plurality of segments to be a second reading segment and selecting others of the plurality of segments to be second background segments. The program further provides for displaying the second reading segment according to a first readability parameter in the location of the reading row; and displaying each second background segment according to a second readability parameter in the location of a respective background row.

In accordance with another embodiment, the disclosure provides for an electronic device for use by a visually impaired reader. The electronic device includes an input device, a display device, a processor; and a program having executable instructions stored in the memory and configured to be executed by the processor. The program includes executable instructions for organizing the content into a plurality of segments, selecting a first of the plurality of segments to be a first reading segment and selecting others of the plurality of segments to be first background segments; and displaying a pane on the display device, the pane configured as a plurality of rows, each row configured to display characters, wherein a first row of the plurality of rows is a reading row and each other row is a background row. The program further includes instructions for displaying the first reading segment according to a first readability parameter in the location of the reading row and displaying each first background segment as visual filler in the location of a respective background row. The program responds to a receipt of a transition prompt by selecting a second one of the plurality of segments to be a second reading segment and selecting others of the plurality of segments to be second background segments, displaying the second reading segment according to a first readability parameter in the location of the reading row; and displaying each second background segment according to a second readability parameter in the location of a respective background row.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Figure 1A:
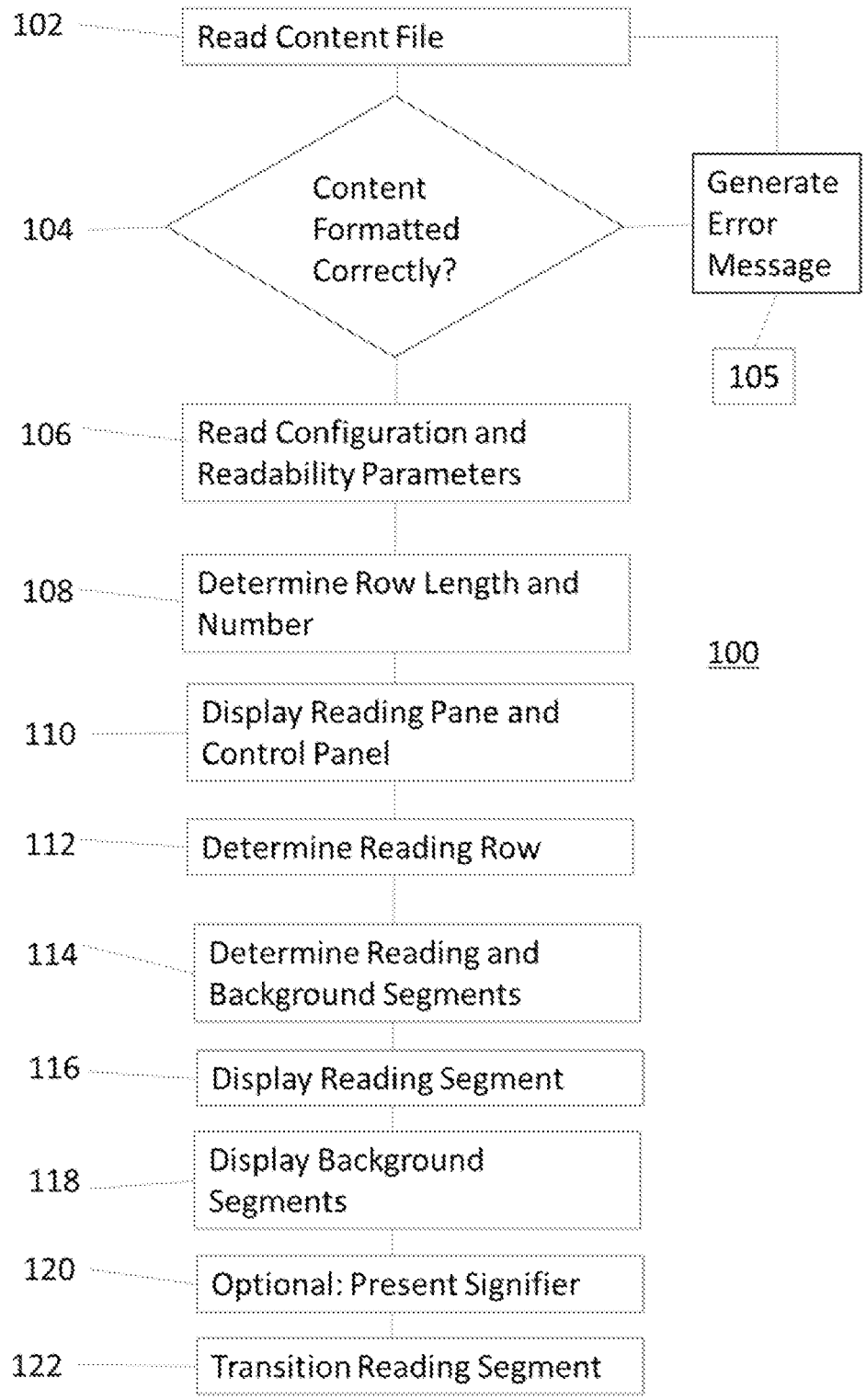
FIG. 1A depicts a flowchart of one method for improving the readability of content on a display device in accordance with an embodiment of the present invention.

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Furthermore, the subject application references certain processes which are presented as series of ordered steps. It should be understood that the steps described with respect to those processes are not to be understood as enumerated consecutive lists but could be performed in various orders while still embodying the invention described herein.

Reader interfaces for use on computing devices are known in the art and include, without limitation, Nook e-reader and application software (available at barnesandnoble.com) and the Kindle e-reader and application software (available at amazon.com). Such interfaces allow readers to read text-based content on electronic devices. Electronic devices provide a number of advantages over traditional bound paper reading materials such as: improved portability, network access to content, and customization of the interface (e.g., font size, text layout.)

As discussed in greater detail herein, the present disclosure describes systems and methods that allow a user who is reading content on an electronic device to read the content more easily and efficiently. Moreover, the disclosed systems and methods provide certain advantages for readers who suffer from certain types of visual impairments which may impact their PCR response, for example, dyslexia or other difficulties that distort a reader's visual response to central vs. peripheral parts of his or her visual field. Readers who suffer from such visual impairments can have an easier time reading content on a display when the text displayed in the center of the reader's visual field is highlighted with respect to the text on the rest of a display of the electronic device. That is, the reader can read more easily when the line that he or she is reading is highlighted with respect to the other lines on the page. Displaying the highlighted line as well as the other lines on the page in lieu of the highlighted line alone is beneficial because studies have indicated that providing a page or display device with a single reading line of text only decreases reading efficiency.

Figure 1B:
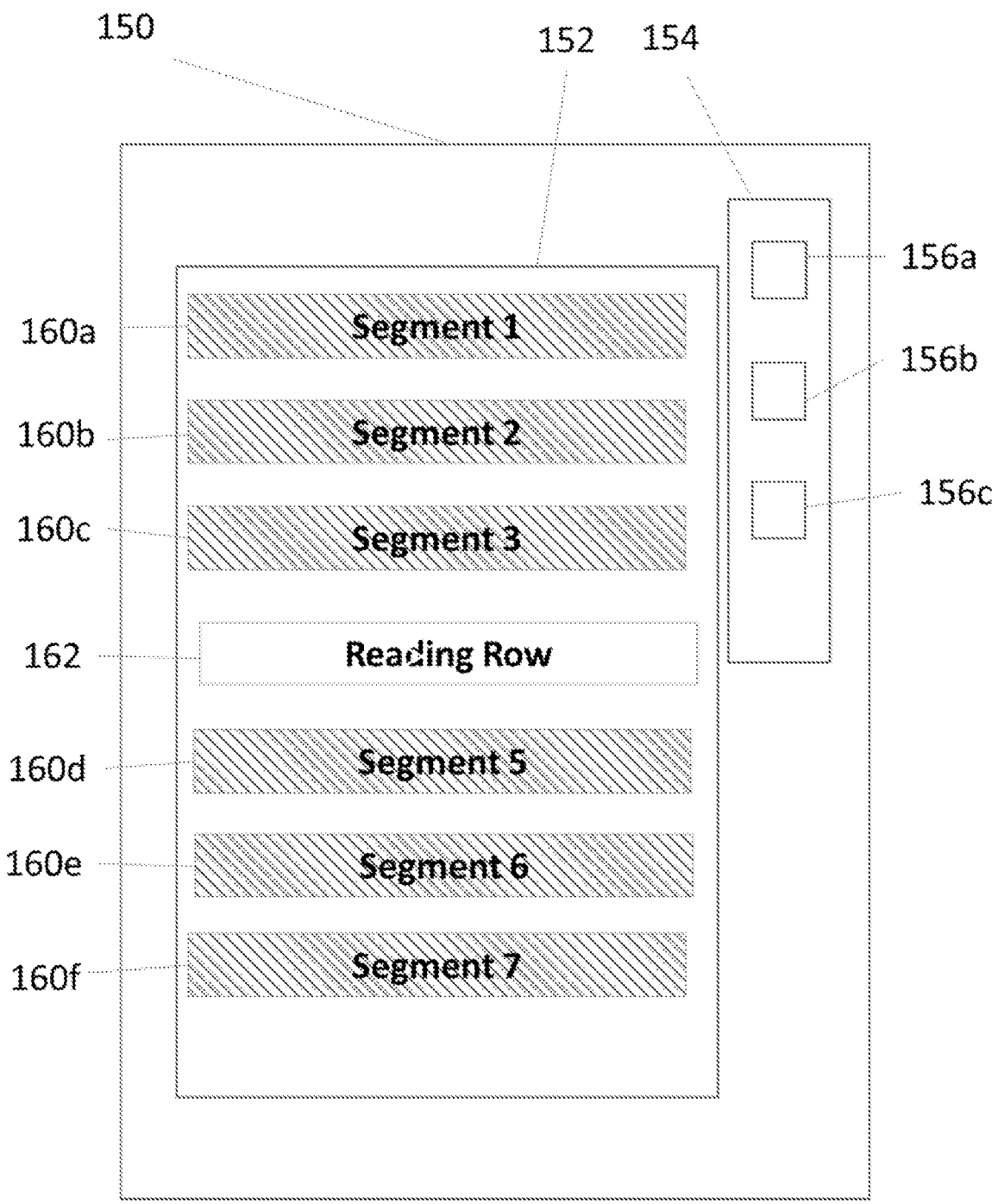
FIG. 1B depicts a device including a display area (pane) and a control area, the content on the display area (pane) is displayed according to the method described in the flowchart of FIG. 1 in accordance with certain embodiments of the present invention.
Figure 2:
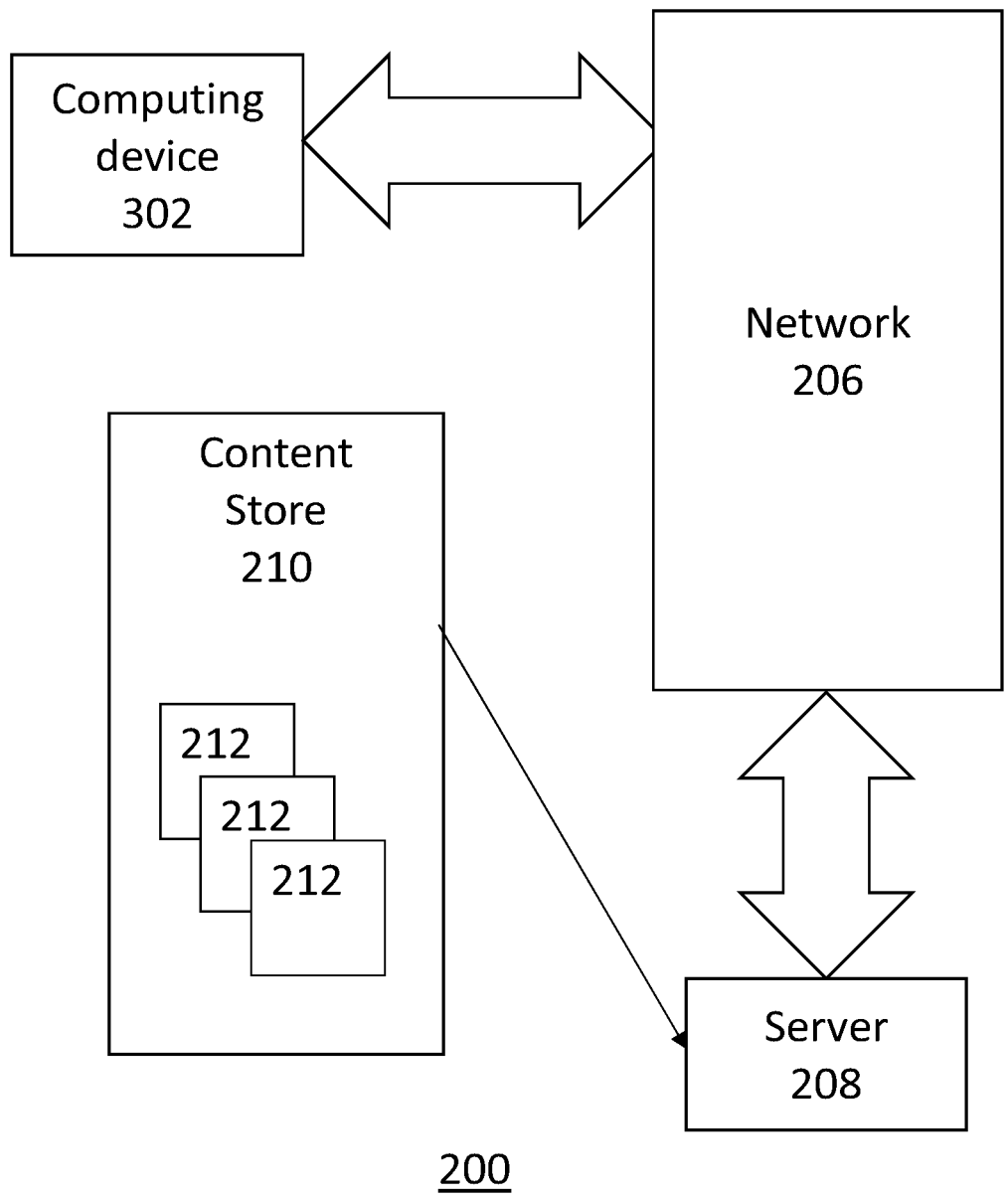
FIG. 2 depicts a schematic view of an exemplary network environment within which various embodiments of the present invention may be implemented.
Figure 3:
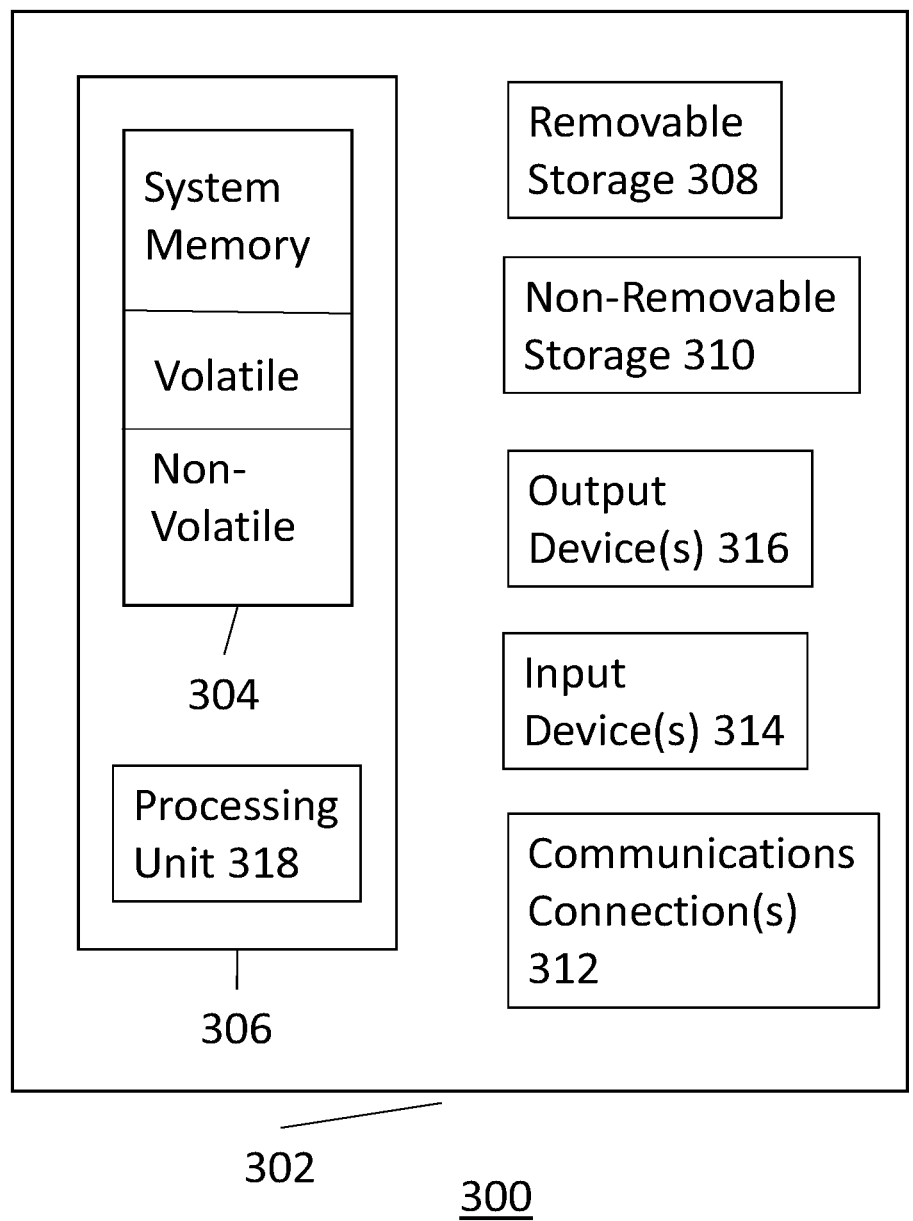
FIG. 3 depicts a block diagram of an exemplary computing device with which various embodiments of the present invention may be implemented.

FIG. 2 represents an exemplary computing system environment and an exemplary content store, respectively, for allowing a user of computing device 302 (described in detail below) to receive content via a network and/or server and to perform the techniques described herein with respect to FIGS. 1A-8B. The depicted computing system environment is only one example of a suitable computing environment and is not intended to suggest any limitation as to the scope of use or functionality. Depicted in FIG. 2 is an exemplary system 200 for implementing a network-based embodiment of the present invention. Such a network-based embodiment is suitable for readers who receive content or display functionality distributed to their device over the network. This exemplary system includes, inter alia, a computing device 302 and server 208, which interface to each other via network 206. Server 208 has access to content store 210, wherein content files are stored. Content store 210 may be located in a database resident on server 208, an independent database or other memory accessible by server 208, a similar content management system, a disk storage or other similar system suitable for storing and accessing electronic files. Content store 210 has one or more content files 212 which are accessible from server 208. In certain embodiments server 208 provides networked access (through download or streaming) to the content files 212 to make those files accessible on computing device 302. It should be noted as that computing device 302 has a system memory suitable for local temporary or permanent storage of content files. In some embodiments of the present invention, network 206 is the Internet and computing device has an Internet connection that allows content to be downloaded, streamed, or the like from the remote server 208. FIG. 3 depicts a schematic view of an exemplary computing device 302 on which various embodiments of the present invention may be implemented in a standalone manner or in a networked manner as described herein. For example, a user of a computing device such as computing device 302 may utilize the device to read content and to perform the processes described herein with respect to FIGS. 1-2 and 4A-8B. The depicted computing system environments depicted in FIGS. 2 and 3 are exemplary of two suitable computing environments and are not intended to suggest any limitation as to the scope of use or functionality. Numerous other general purpose or special purpose computing system environments, computing devices, and configurations may be used or substituted. Examples of well-known computing systems, devices, environments, and/or configurations that may be suitable for use include, but are not limited to, personal computers ("PCs"), server computers, handheld or laptop devices, multi-processor systems, microprocessor-based systems, network PCs, minicomputers, mainframe computers, e-readers, cell phones, tablets, embedded systems, distributed computing environments that include any of the above systems or devices, and the like.

Computer-executable instructions such as programs or program modules executed by a computing device or processing unit may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

Computing device 302, in its most basic configuration as depicted in FIG. 3, includes at least one processing unit 318 and at least one memory 304. Depending on the exact configuration and type of the computing device, memory 304 may be volatile (such as random access memory ("RAM")), non-volatile (such as read-only memory ("ROM"), flash memory, etc.), or some combination of the two. In addition to that described herein, computing device 302 can be any network-accessible device (e.g., cell phone, smart phone, e-reader, personal computer, or the like) including those operating via Android, Apple, and/or Windows mobile or non-mobile operating systems.

Computing device 302 may have additional features/functionality. For example, computing device 302 may include additional storage (removable and/or non-removable) including, but not limited to, magnetic or optical disks or tape, thumb drives, and external hard drives as applicable. Such additional storage is illustrated in FIG. 3 by removable storage 308 and non-removable storage 310.

Computing device 302 typically includes or is provided with a variety of computer-readable media. Computer-readable media can be any available media that can be accessed by computing device 302 and includes both volatile and non-volatile media, removable and non-removable media. By way of example, and not limitation, computer-readable media may comprise computer storage media and computer memory which contains on a transitory basis communication media that are streamed to device 302 via communication connections 312.

Computer storage media includes volatile and non-volatile, removable and non-removable media implemented in any method or technology for storage of information such as computer-readable instructions, data structures, program modules or other data. Memory 304, removable storage 308, and non-removable storage 310 are all examples of computer storage media. Computer storage media includes, but is not limited to, RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can accessed by computing device 302. Any such computer storage media may be part of computing device 302 as applicable.

Computing device 302 may also contain communications connection 312 that allows the device to communicate with other device. Communication media typically embodies computer-readable instructions, data structures, program modules and/or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, radio frequency ("RF"), infrared and other wireless media. The term computer-readable media as used herein includes both storage media and communication media.

Computing device 302 may also have input device(s) 314 such as keyboard, mouse, pen, voice input device, touch input device, etc. Output device(s) 316 such as a display, speakers, printer, etc. may also be included. All these devices are generally known to the relevant public and therefore need not be discussed in any detail herein except as provided.

Notably, referring back to FIG. 2, computing device 302 may be inter-connected with network 206. As may be appreciated, network 206 may be any appropriate network and computing device 302 may be connected thereto by way of an interface such as communication connections 312 in any appropriate manner, and computing device 302 may communicate with one or more of the other computing devices via network 206 in any appropriate manner. For example, network 206 may be a wired network, wireless network, or a combination thereof within an organization or home or the like, and may include a direct or indirect coupling to an external network such as the Internet or the like. Likewise, network 206 may be such an external network including, without limitation, the Internet.

Computing device 302 may connect to server 208 via an internal or external network. Although FIG. 2 depicts computing device 302 located in close proximity to server 208, this depiction is not intended to define any geographic boundaries. For example, when network 206 is the Internet, computing device can have any physical location. For example, computing device may be a tablet, cell phone, personal computer, e-reader, or the like located at any user's office, home, etc. Or computing device could be located proximate to server 208 without departing from the scope hereof. Also, although FIG. 2 depicts computing device 302 coupled to server 208 via network 206, computing devices may be coupled to server 208 via any other compatible networks including, without limitation, an intranet, local area network, or the like.

In FIG. 2 the depicted embodiment of system 200 uses a standard client server technology architecture, which allows users of system 200 to access information stored in the database 210a via a user interface. The application or program may be in communication with a server such as server 208 which is accessible via a network such as the Internet using a publically addressable Uniform Resource Locator ("URL") in order to receive content to display. For example, users can access content from exemplary system 200 using any web-enabled device equipped with a web browser. Communication between software component and sub-systems are achieved by a combination of direct function calls, publish and subscribe mechanisms, stored procedures, and direct SQL queries, however, alternate components, methods, and/or sub-systems may be substituted without departing from the scope hereof.

In the depicted embodiment, computing device 302 may be equipped with one or more Web browsers to allow them to interact with server 208 via a Hypertext Transfer Protocol ("HTTP"). HTTP functions as a request-response protocol in client-server computing. For example, a web browser operating on computing device 302 may execute a client application that allows it to interact with applications executed by server 208. The client application submits HTTP request messages to the server. Server 208, which provides resources such as HTML files and other content, or performs other functions on behalf of the client application, returns a response message to the client application upon request. The response typically contains completion status information about the request as well as the requested content. However, alternate methods of computing device/server communications may be substituted without departing from the scope hereof.

In the exemplary system 300, computing device 302 stores in its system memory 304 one or more content files (files that contain text suitable for reading such as that taken from a book, a magazine article, or the like) stored in a format suitable for transferring over the network and processing at the computing device 302. Examples of suitable file formats for content stored in the content store include: ASCII, PDF, TXT, .DOC, .lrf, .lrx, .chm, .epub, or the like. Typical content files have associated metadata such as a file name, author, edition, information relating to the type of content (e.g., genre associated with the content), and the like which are stored in the content file (for example, in the header of the content file). Certain content files may include information regarding the formatting or layout of the content such font, font size, the location within the content of line breaks, and the like.

As shown in FIG. 3, a computing device 302 has a system memory that is locally attached and/or integrated into computing device 302. The local content store contains files suitable for processing by the system described herein. Such files may be obtained for storage on the memory 304, removable storage 308, and/or non-removable storage 310 through various techniques including, but not limited to, having been: downloaded via a network connection (e.g., from a network via communication connection 312); stored in a local buffer as a part of a media stream; pre-loaded on memory 304, removable storage 308, and/or non-removable storage 310; generated locally at the computing device; transferred from a removable storage device 308 (e.g., a flash drive) to memory 304; or similar methods of obtaining electronic files for storage on a storage device.

It should be understood that the various techniques described herein may be implemented in connection with hardware or software or, as appropriate, with a combination of both. Thus, the methods and apparatus of the presently disclosed subject matter, or certain aspects or portions thereof, may take the form of program code (i.e., instructions, scripts, and the like) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter (e.g., through the use of an application-program interface ("API"), reusable controls, or the like). Such programs may be implemented in as code in a high-level procedural or object-oriented programming language to communicate with a computer system. However, the program(s) can be implemented in assembly language or machine language, if desired. In any case, the code may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as system 300 or a distributed computing environment. Still further, aspects of the presently disclosed subject matter may be implemented in or across a plurality of processing chips or devices, and storage may similarly be effected across a plurality of devices in or connected with system 300. Such devices might include personal computers, network servers, and handheld devices (e.g., cell phones, tablets, smartphones, etc.), for example.

In the exemplary embodiment, computing device 302 is programmed to execute a plurality of processes including those referenced with respect to FIGS. 1, 2, 4A-8b as discussed in greater detail below.

Figure 4A:
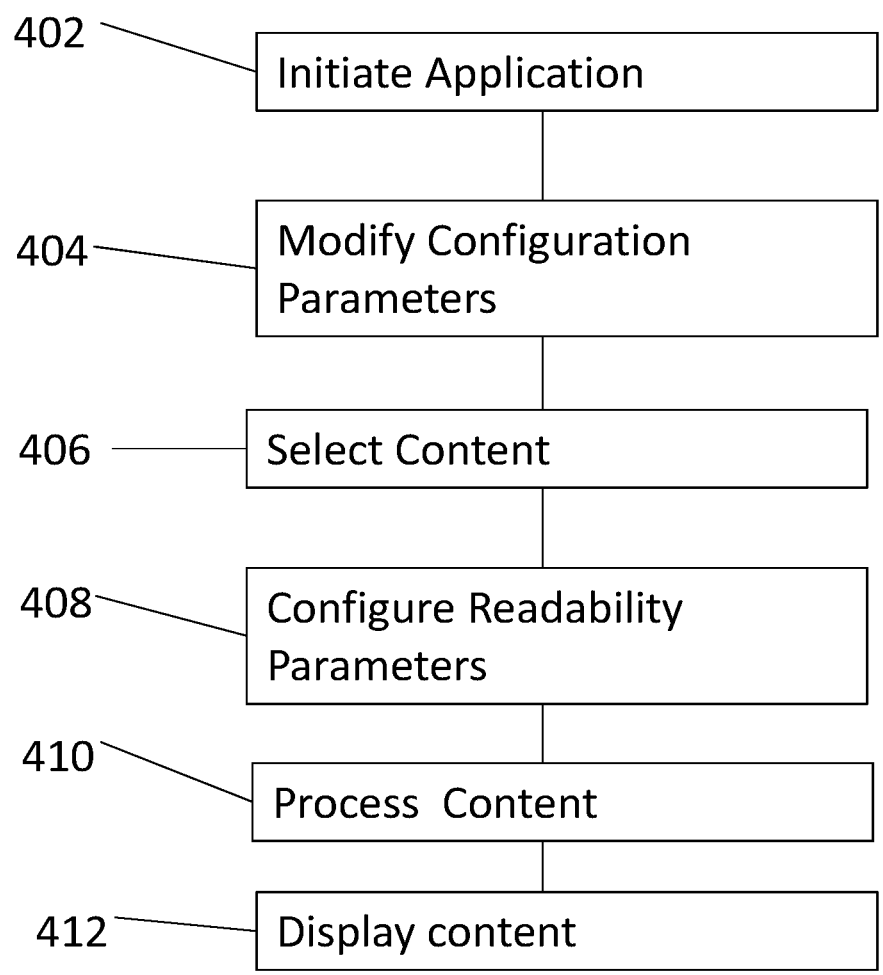
FIG. 4A depicts an alternate flowchart of a process of displaying content in accordance with an embodiment of the present invention.

Referring now to FIG. 4A, depicted is an exemplary process 400 for displaying content on a computing device. First, at step 402, the application ("program") is initiated. This step occurs, for example, after the application is initiated within an operating system such as Android, Windows, iOS, or a similar computing device system. Such initiating may occur, for example, when the user double clicks an icon associated with the application. In certain embodiments of the present disclosure, for example when the user is using the application to consume content on an e-reader, turning on the computing device (i.e., the e-reader) may automatically initiate the application as indicated in step 402.

The user has the option of modifying configuration parameters as shown in step 404. In certain embodiments of the invention, the configuration parameters may be modified or set by the user prior to initiating the application via preset parameters stored in memory. Such preset parameters may be entered through available interfaces (e.g., the control panel of the computing device, an application settings interface, etc.) as further described below.

Configuration parameters are used by the application to determine the setup of the area of the display device in which the text of the content is displayed (i.e., the "pane".) The configuration parameters may also include information that is used by the application in setting the display features as well as display and program functionality provided to the user via a control area. The control area provides an interface to an application user which allows the user to modify some of the functionality of the application. Configuration parameters may include, but are not limited to: the refresh rate of a Cathode-Ray Tube ("CRT"); the width, height and/or shape of the pane (as described below), quantity, size, and/or location of text rows ("rows") presented in the pane; the length of each row in the pane; the color of the pane; the language in which the text of the controls will be displayed; the brightness of the pane, and any other parameters that determine the manner in which the pane and/or control area appears on the display device.

As utilized herein, a pane is the region of the display device in which the text of the content designated to be displayed to a user appears on the display device. An example of a pane 152 on a display 150 is illustrated in FIG. 1B. As also shown in FIG. 1B, pane 152 includes a plurality of rows indicated by 160a-160g and 162, each of which corresponds to a specific location in the pane. However, alternate forms of pane 152 may be substituted without departing from the scope of the present disclosure including, without limitation, a window displayed on the display device or the presentation area of a web browser (i.e., the area in the browser where a web page is displayed). In certain embodiments, a pane may appear as if it partially or fully covers material previously presented to the user via the display device.

In certain embodiments, a control area 154 as indicated in FIG. 1B may be located adjacent to (as in FIG. 1B) pane 152. Control area 154 may include user controls including, but not limited to, selectable graphical controls 156a-c which may be used to control the functionality or various aspects of the appearance of the application. Examples of functions which may be utilized or modified via the user controls include: setting or re-setting configuration parameters as discussed above, setting or re-setting parameters that determine how text of the content is displayed (i.e., readability parameters) as discussed below, and application controls (e.g., stopping, pausing or changing the speed of text transitions) as discussed in greater detail below. Also, such controls may also be used to select a particular content file for display by the application.

Generally, the graphical controls may allow a user to alter readability parameters of the text and to modify the transition or scrolling behavior of the application. Upon receiving a signal generated by the selectable graphical controls, the application responds by changing its functionality (for example, how it displays content). Other examples of signals that can be generated by the selectable graphical controls are signals that cause the application to: pause the transition of text (which pauses the transition of the text), change scrolling mode (e.g., from vertical scrolling to horizontal scrolling or vice versa), reverse the direction of the scrolling, or change the speed at which the text transition occurs. However, alternate embodiments are envisioned in which the control area 154 is not always visible but rather is displayed upon command. In such embodiments, when initiated by the user, the control area "pops up" on the display device in a window or the like and may appear as if it is covering some or all of the material that was previously presented to the user (e.g., pane 152) via the display device. In yet another alternate embodiment, the application is controlled by keyed entries made by the user (e.g., activation of function keys or the like via a keyboard or other input device) without the need for a corresponding display of the controls via a "pop up" window, control area, or the like.

Display of the control area 154 may be initiated by the user via a mouse click or similar user input to the application. Or, alternatively, in certain embodiments of the present disclosure, the configuration parameters may be preset or may be determined automatically by the application based on environmental or computing device conditions including, but not limited to: battery life, quantity and quality of the ambient light in the location where the display is viewed, and the like.

Returning to FIG. 4A, in step 406, the user selects content that will be displayed on the pane. In an exemplary embodiment the user may use controls 156a-c to select content. The user may select content to be read through various techniques such as by clicking or double-clicking the name of the content as it appears in a list displayed to the user. Alternatively, the user may type metadata (e.g., a file name, genre, or similar information) associated with the desired content into an address field or a search field in order to locate and retrieve such content. In an exemplary embodiment, a content would be an electronically accessible file containing a book, article, or other reading material.

In step 408, the user configures readability parameters. The readability parameters are used by the application to determine how the application displays the text of the content on the rows of the pane. Typically, the content is made up of characters, words, or other arrangements of characters which are presented to the user via the display device.

The readability parameters are used to determine how the text of the content is displayed to the user. For example, readability parameters may include, but are not limited to, row background color, text color, font size, font type, contrast ratio (i.e., the contrast ratio between the text and the background on which the text is displayed). Different sets of parameters may be used for text that appears at different locations (rows). In the depicted embodiment, for example, the reading row(s) and background row(s) have different sets of parameters that may be individually set by the user, however, the invention is not so limited. It should be noted that we refer herein to a readability parameter in the singular form but a readability parameter may be a parameter that includes multiple parameters which collectively determine a number of distinct aspects of how text will be displayed in a particular row (e.g., vector structure). That is, a single readability parameter may include any and all of: font type, font size, background style, background color, text effects (e.g. boldface, all caps), or similar descriptors that may be used to determine how the text is displayed.

In certain embodiments the readability parameters associated with each of the reading row and the background row are specified so that a high contrast is provided between the text displayed in the reading row and the text displayed in the background row. An embodiment utilizing such readability parameters is referred to as operating in High Contrast Mode. In particular, such embodiments provide a high contrast display mode for content displayed on the panel. In high contrast mode a line of text is highlighted relative to the other lines of text which appear on the screen.

An example of different rows of text, some of which are displayed according to one or more distinct readability parameters is shown in FIG. 1B. FIG. 1B illustrates an example of pane in accordance with an embodiment of the invention in which the text in row 162 (the "reading row") is presented with a set of first readability parameters and the text in rows 160*a-g* (the "background rows") are presented with a second set of readability parameters. More specifically, the text displayed on row 162 is presented in a boldfaced font against a white background. The text presented in rows 160*a-g* is presented against a hashed background and in a non-boldface font. Displaying the rows of text in a manner that highlights the text in the reading row, as illustrated in the exemplary embodiment depicted in FIG. 2, allows some readers to more efficiently read text displayed in the reading row.

Referring again to FIG. 4A, in step 410, the application processes the content. In performing this step, the program organizes the content into segments, each segment containing one or more words or other characters of the content. As discussed in greater detail below, FIG. 4B illustrates a flow chart of a process 500 of an exemplary method of processing content for display to the user.

In step 412, the application displays some or all of the content on the pane. The pane is displayed according to the configuration parameters. The content is processed by the application and thus organized into segments (each segment includes characters and/or words from the content). Each segment is presented on an associated row. As mentioned previously, different rows (and hence different segments) may be presented according to distinct readability parameters.

Figure 4B:
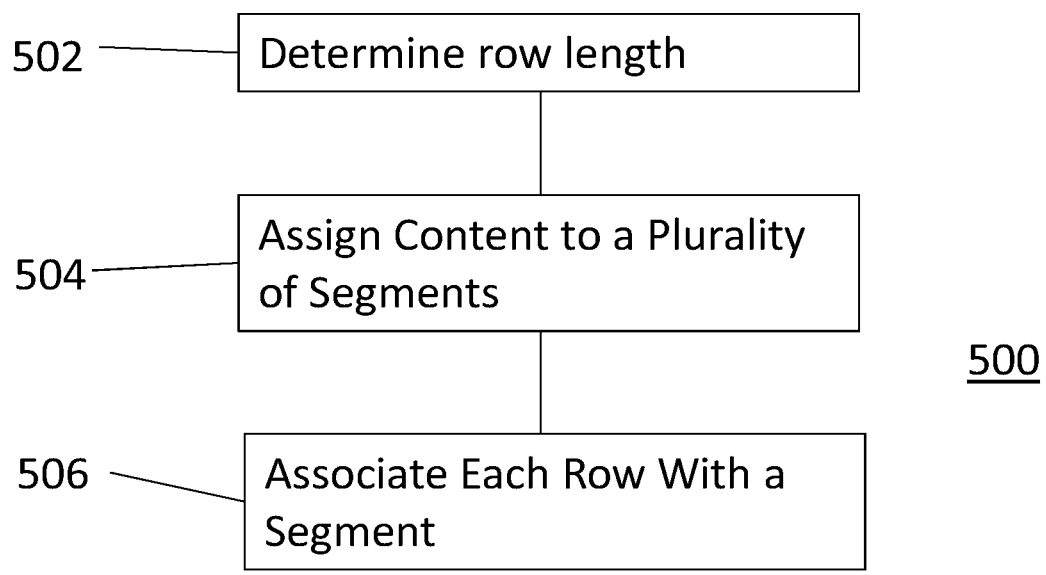
FIG. 4B depicts a flowchart of a process of organizing content into segments in accordance with an embodiment of the present invention.

Referring now to FIG. 4B, depicted is an exemplary flowchart of a process 500 for organizing content into segments in accordance with an embodiment of the present invention. In step 502, the length of each row ("row length") in the display area (i.e., pane 152) is determined. The row length is used to determine the number of characters of text that can fit in that row. Various techniques may be used to determine the row length. In an exemplary embodiment, the application determines the length (in characters) of each row by dividing the width of the pane (which is defined by the configuration parameters) by the width of the characters to be displayed. Certain fonts have characters which take up a fixed amount of space. Alternatively, some fonts have variable width characters. In an instance in which a variable width font is used, the application may calculate the length of the row by dividing the width of the pane by the width of the widest character in the font set.

In step 504, the words and other characters of the content are organized into segments (e.g., each segment is sized so as to fit within a single row). The content is composed of a set of characters (e.g. letters, punctuation marks, spaces, and other marks which may be represented as ASCII characters). The application processes the content to identify and count each distinct word within the content. In an exemplary embodiment, the number of characters in each segment is calculated by determining the width of a row in characters. This calculation is performed based on the characteristics of the pane (which may define the width of a row) and the size of the characters that will be used to display the content, both of which may be set by the user as described above. Various techniques are available to calculate the number of characters per segment, and such techniques may vary based upon whether the font to be used employs characters of fixed width (i.e., all characters in the font have the same width) or variable width (i.e., the characters in the font have varying widths). If the font width is fixed, the number of characters in a row may be determined by dividing the row width by the character width. Various techniques may be used for fonts with variable width including, without limitation, assigning each character to have a width equal to the width of the widest character in the font and performing the division as described above for fixed font characters.

After determining the number of characters that can fit in a row/segment, words from the text of the content are associated with a plurality of numbered segments in consecutive order. More specifically, the first words of the content are associated with a first segment. When the first segment is full (i.e., there is not enough space left in the segment for the next characters or the characters of the next word), the next characters or the characters of the next word are used to create a second segment. That is, the application counts the number of characters as they are added to the first segment until the word or other character(s) added to the first segment would cause the length of the first segment to exceed the length of the row as calculated above. When this occurs, the last word or other character(s) (i.e., the word or other character(s) that caused the segment to exceed the row length) is removed from the first segment. The first segment is then closed (that is, the words associated with that first segment are assigned and the next (second) segment is opened to receive words). That is, the first word or other character(s) of that next (second) segment is the last word or other character(s) removed from the previous (first) segment. In this manner, all of the words or other character(s) of the complete text of the content are assigned to a plurality of consecutively numbered segments and the text of the content may be fully reproduced by presenting each numbered segment to the user in a consecutive manner. The quantity of segments that are generated based on a particular content may vary based upon criteria including, but not limited to: row length; font size and type; and lengths of the words of the content. It should also be noted that the quantity of segments generated for a particular content may vary if a user reconfigures any of the parameters discussed above.

In accordance with certain embodiments of the present invention, certain content files may include metadata in the header of the file which can be utilized by the application in performing step 504. For example, such metadata may be used by the application in the step of organizing the content into segments. In such instances the step of organizing the content into segments includes reading the content file header (using any of the various well known techniques for reading header information from electronic files) and organizing the content into segments based on the information. In an example wherein the application organizes the content into segments based on the information stored in the content file header, a content file includes a list of numbers which define the words from the text of the content go into each segment. To illustrate an example of segments organized based on such metadata, a particular content file header may specify the organization as follows: the first segment (which may be the reading segment) is specified to be associated with words one through ten words from the content; the second segment is specified to be associated with words eleven through nineteen from the content. Generally in such an instance the metadata will further include information regarding the configuration parameter to be used in presenting the content. In an instance where the row length of the pane is not sufficient to display a segment defined according to such metadata the application generates an error. The application may determine whether the length of the pane is not sufficient to display a segment based on an analysis (counting the characters) of the words in the segment.

Still referring to FIG. 4B, in step 506, at least a portion of the segments generated in step 504 are associated with respective rows for display to the user. When the content is first displayed to the user, the first segment to be read by the reader (which typically corresponds to the first words or other character(s) of the content) is assigned to be the reading segment, and the reading segment is associated with the reading row. That is, the words and other characters of the reading segment will be displayed in the location of the reading row. As a reader reads each segment of the content, the following segment on the pane is consecutively selected to be a reading segment. The reading segment is associated with the reading row and is presented to the reader according to the readability parameter associated with the reading row. Thus, as each reading segment is consecutively read, the reader progresses through the content. Hereinafter, the segment associated with the reading row will be referred to as the reading segment, and segment(s) associated with background row(s) will be referred to as background segment(s).

Figure 5:
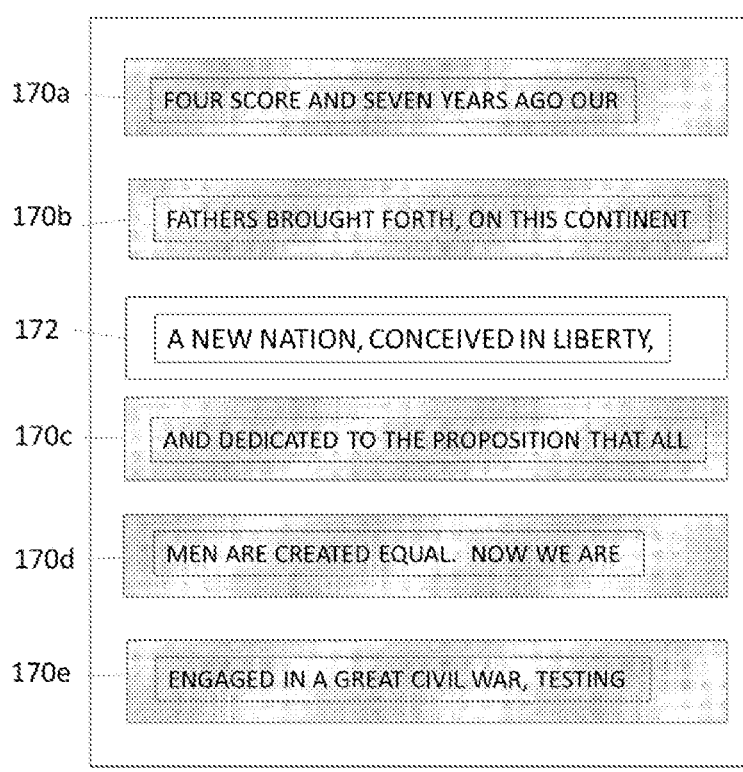
FIG. 5 illustrates an exemplary pane for displaying content in a first state in accordance with an embodiment of the present invention.

To reiterate, in the embodiment depicted in FIG. 5, on the pane, one of the rows is identified as a reading row and the remainder of the rows are background segments. A segment associated with the reading row is displayed differently than segment(s) associated with the background row(s).

Referring back to FIG. 4A, in step 412, after the content has been processed for display using a process such as, but not limited to, process 500, the content is displayed to the user via the display device. That is, the segments associated with each row as per a process such as process 500 are displayed in the location of the corresponding row on the pane. Further, the reading segment is displayed in the location of the corresponding reading row according to a first readability parameter, and background segment(s) are displayed in the location of the corresponding background row(s) according to a second readability parameter, both of which are discussed in greater detail above with respect to process 500. For example, see FIG. 1B which illustrates background rows 160a-160g displayed according to a different set of readability parameters than those used to display reading row 162.

FIG. 5 illustrates an exemplary pane for displaying content to a user in a first state in accordance with an embodiment of the present invention. In this depicted embodiment, rows 170a-170e are background rows and row 172 is a reading row. In background row 170a, a segment which includes the opening words "FOUR SCORE AND SEVEN YEARS AGO" of the Gettysburg Address (in this example, the content) is displayed. Similarly, rows 170b-170e and row 172 display segments of the following text of the content in the same order in which they appear in the original content (as a user reads from the top to the bottom of the display device). In reading row 172, a segment which includes the words "A NEW NATION CONCEIVED IN LIBERTY, AND" is displayed.

This display mode and method of displaying the text allows a reader to focus on the single line of text presented in reading row 172 more easily. That is, in a typical use wherein a reader is reading content using the application, the reader focuses on, and reads the text displayed on reading row 172. While the reader is reading the text displayed on the reading row, an opportunity is provided for the reader's peripheral vision to observe and begin to process the characters presented in the background rows above and below the reading row.

After the reader has read the text displayed in the reading row, a transition prompt is generated to cause the application to display a new line of text in the reading row. In response to a transition prompt, the application transitions from the display of a current reading segment to the display of a new reading segment. In certain embodiments, a transition from a current segment (e.g., in the reading row) to a new segment (e.g., in the reading row) is performed according to a scrolling mode. Examples of scrolling modes include, but are not limited to: horizontal scrolling mode and vertical scrolling mode. Horizontal scrolling mode is performed when the characters in the displayed segments are sequentially moved horizontally (to the right side or the left side) or "scrolled" so that characters displayed in each row appear on the opposite end of an adjacent new row as they leave the edge of the prior row. As characters continue to "scroll," the characters on the new row continue to move in unison to the right or left side of the display device until all characters have been transferred from their prior row to their new row. In an exemplary embodiment, when all displayed segments for all rows have fully transferred from their respective prior rows to their new rows, scrolling will stop to await a new transition prompt. When received, another scroll will be performed in the same manner. It should be noted that, during scrolling, the segment located in an uppermost row will appear to scroll "off the screen", i.e., it will no longer be visible once scrolling is complete. Similarly, during scrolling, a new segment that was not previously displayed to the user will scroll into the bottommost row, i.e., it will become visible once scrolling is complete unless the user is nearing the end of the content. In the latter scenario, the bottommost row will become blank or may be filled with characters that indicate that the end of the content has been reached.

Figure 6:
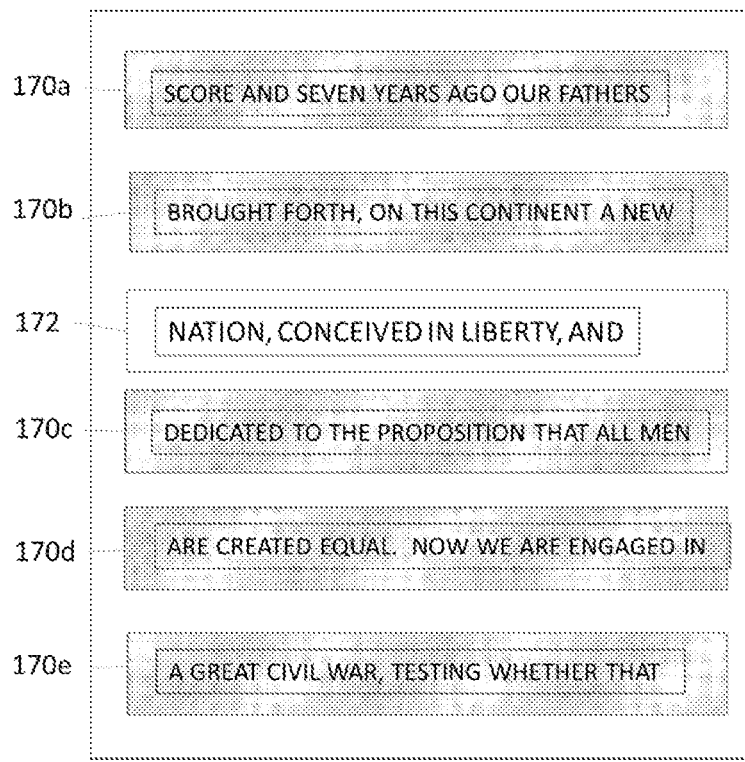
FIG. 6 illustrates the pane of FIG. 5 in a second state in accordance with an embodiment of the present invention set to horizontal scrolling mode.

An example of a transition performed with horizontal scrolling is illustrated in a comparison of FIG. 5 and FIG. 6. FIG. 5 shows each row 170a-e and 172 containing words that are associated with a respective segment in that row. In FIG. 6 a word has scrolled into each row on the side, the word appears to have moved from the segment displayed on the row below to the segment displayed on the row above. For example, in FIG. 5, row 170b reads, "FATHERS BROUGHT FORTH, ON THIS CONTINENT" After scrolling has started (but before the scrolling has completed) as shown in FIG. 6, row 170b reads "BROUGHT FORTH ON THIS CONTINENT A NEW." The processes illustrated in, for example, FIGS. 1 and 4A will continue until the complete line of text that is shown in row 170c in FIG. 5 ("AND DEDICATED TO THE PROPOSITION THAT ALL") is displayed on line 172 in FIG. 6, at which time the application will pause and await another transition prompt.

In certain embodiments, a transition may be performed by stepped scrolling. Stepped scrolling is similar to horizontal scrolling in that word-by-word a segment is scrolled into a reading row. However, stepped scrolling is different from horizontal scrolling in that after each word is scrolled onto the reading row, the application pauses until a transition prompt is generated.

In certain embodiments, a user may select a particular scrolling mode (e.g., horizontal, vertical, or stepped scrolling) or another scrolling option by using selectable graphical controls such as graphical controls 156a-c shown in FIG. 2 as described in greater detail above. Furthermore, although the depicted embodiments shows horizontal scrolling in which the characters scroll to the right, alternate embodiments are envisioned in which the characters scroll to the left. The particular type of scrolling (e.g., left or right scrolling) may be selected by the user via, for example, the graphical controls.

Vertical scrolling mode is performed when the characters in the displayed segments are sequentially moved up or down (from the line above or the line below) or "scrolled" so that the characters displayed in a particular row appear on the row above or below the particular row. For explanatory purposes, the description of vertical scrolling herein will correspond to scrolling upward (that is, the characters displayed in each row are scrolled on to the row above) but it should be understood that in other embodiments the application may be configured to scroll the characters downward. Once the characters displayed in each row have been scrolled upward to their new rows, scrolling will stop to await a new transition prompt. When received, another scroll will be performed in the same manner. It should be noted that, during scrolling, the characters in the segment located in the uppermost row will appear to scroll "off the screen", i.e., they will no longer be visible once scrolling is complete. Similarly, during scrolling a segment that was not previously displayed to the user will scroll into the bottommost row of the pane. This will continue until the reader approaches the end of the content. As the user is nearing the end of the content, the bottommost row will become blank or may be filled with characters that indicate that the end of the content has been reached.

Figure 7:
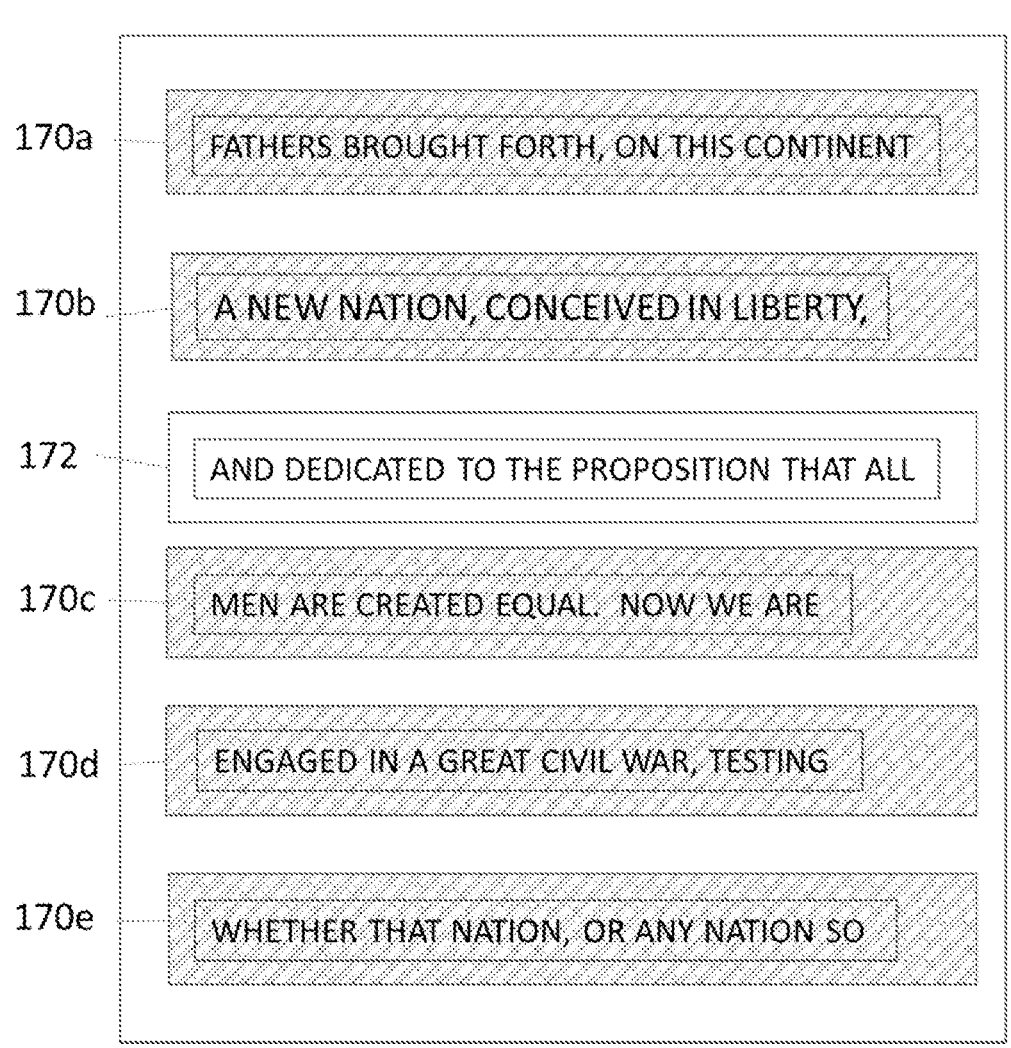
FIG. 7 illustrates the pane of FIG. 5 in a second state in accordance with an embodiment of the present invention set to vertical scrolling mode.

An example of a transition performed with vertical scrolling is illustrated in a comparison of FIGS. 5 and 7. FIG. 5 shows each row 170a-e and 172 containing words that are associated with a respective segment for that row. In FIG. 7, the segments displayed on each row have scrolled upwards on the pane relative to their positions in FIG. 5. In FIG. 5, row 172 reads, "A NEW NATION, CONCEIVED IN LIBERTY, AND". After a vertical scroll is completed as shown in FIG. 6, row 172 reads "DEDICATED TO THE PROPOSITION THAT ALL." That is, during vertical scrolling, all of the words and characters in a segment move from one row to another simultaneously. This is in contrast to horizontal scrolling, as described above, wherein the words and/or characters of a particular segment largely move from one row to another independently. As discussed with regard to horizontal scrolling, although the embodiment depicted in FIGS. 5 and 7 shows vertical scrolling in which the characters scroll upward, alternate embodiments are envisioned in which the characters scroll downward. The particular scrolling direction (e.g., upward or downward scrolling) may be selected by the user via, for example, the graphical controls.

Returning to FIG. 1A, depicted is a process 100 that illustrates the steps of an exemplary application in accordance with the present disclosure. In an embodiment, an application such as this may be stored on a non-transitory computer readable medium (such as system memory 304) which when executed on a processor of a computing device will perform a series of steps as indicated. In other embodiments, a program such as this may be executed on an apparatus for improving the readability of content that includes an input device, a display device, and a processor for executing the application.

In step 102, the application reads the file containing the content. For example, processing unit 318 processes the code of the content file. In step 104, the application determines whether the content 102 is correctly formatted to be displayed by the application. In particular, the application determines whether the content file includes data that can be processed into words and/or characters by the application in a manner in which such words and/or characters can be assigned to a segment as discussed herein. An example of a file that is incorrectly formatted is one that stores the text of the content as a series of images wherein, for example, each image represents a page of the complete text. Such a file would need to be pre-processed (for example, by an OCR program) to generate character strings that correspond to the words in the text in order to be processed by the application described herein. However, alternate embodiments are also envisioned in which such an OCR program or other necessary programs are incorporated as part of the application in order to allow the application to handle incompatible files without the need for third party software and/or file processing.

If the content is correctly formatted, the application will proceed with the processing of the content. If the content isn't correctly formatted, process 100 proceeds to 105, at which the application will generate an error message and prompt the user to select a different file or otherwise respond to the formatting issue.

In step 106, process 100 reads the configuration parameters and readability parameters as previously set by the application or the user as described in greater detail above. Alternatively, the configuration and readability parameters may be read from a default settings file associated with the application. The configuration and readability parameters may also be read from the header of the content file which is accessed in step 102.

In step 108, process 100 determines the quantity and length of the rows to be displayed to the user. The application determines the quantity of rows to be displayed to the user based on the height of the pane and the font type and font size of the text to be displayed. The font and font size determine the row height required to allow all characters to fit in a row. The height of the pane may be divided by the row height to determine the quantity of rows that will fit vertically within the pane.]]

The length of each row to be displayed to the user may be determined based on the dimensions of the pane and the dimensions of the font used to represent the text. The width of the pane may be divided by the character width to determine the quantity of characters that will fit horizontally across the pane. That is, the font and the font size determine how long a segment may be without exceeding the length of the row.

However, in alternate embodiments, the quantity and length of the rows to be displayed to the user may be read from the configuration parameters.

In step 110, the reading pane and the control panel are displayed on the display device according to the configuration parameters read in step 106. The application performs this step by interacting with the operating system and the display device to generate an area on the display device wherein the application output (text of the content organized as described herein) may be displayed. The application further generates a control area on the display device where the control panel is displayed. In an exemplary embodiment, at this step, the background to the reading pane is displayed and the controls are made available to the user of the application.

In step 112, the reading row is determined. In an exemplary embodiment, the reading row is determined to be the row which is located in the middle (with respect to the top and the bottom) of the pane. This can be determined by, for example, by dividing the quantity of rows by two and rounding upward or downward, as needed. The result of this equation will indicate the number of the reading row when rows are counted from the top downward. Or, in certain embodiments, the reading row may be specified by a configuration parameter that is available to be set by a user (e.g., the configuration parameter may specify that a specific row on the pane be the reading row). In such a scenario, the user may select any of the rows to be the reading row. However, alternate methods of selecting the reading row may be substituted including, without limitation, For example a particular reader may prefer to specify the topmost or bottommost row as the reading row. Furthermore, depending on the state and/or configuration of the display device, a particular area on the display device (and hence row on the pane) may be displayed more effectively relative to the other rows (e.g., when a part of a display device malfunctions).

In step 114, the reading segment(s) (the segment that is associated with the reading row) and the background segment(s) are determined. As part of step 114, the content is organized into a plurality of segments and each segment is assigned to a row as discussed with respect to process 500. As a part of this process, as discussed in greater detail above, segments are selected to be a first reading segment and initial background segments. Note that the characters that will be displayed on the reading row are not necessarily the first characters of the content. If the content is new content not previously read by the user, it is likely that the reading row will display the first characters of the content. However, if the content had been partially read by the user in a previous use of the application, it is more likely that the reading row will display content from a point at which the user stopped reading. This content may be saved automatically or manually when the user terminates a reading session prior to reading the complete text of the content.

Alternatively, a reader may specify a particular line of text of the content to be displayed in the reading row via a stored mark. Such a specification may be made, for example, by scrolling through the text and selecting the text via the selectable graphical controls and/or a user input device. A reader may also select a "bookmark" or designate a particular text portion with a mark. The application may provide a list of marks to the user on command in order to allow the user to select the text associated with the mark as the starting point for the current session (i.e., for initial display on the reading row). In such a scenario, the application determines which particular segment correlates to the mark by reading data from local memory (which may be stored in an application state file) that indicates the text associated with the mark. Such information may be associated with a particular user of a device (where the user may be determined via one of various well known authentication methods, such as a password.) and a particular content file. In an embodiment wherein bookmarks are used, the application identifies the text associated with the bookmark and determines which segment includes that text. This is done, for example, with a bookmark that specifies that the mark occurs at the nth word in the text by counting the words in the content until the nth word is reached and displaying the segment containing the nth word as the first segment for that session.

In step 116, the reading segment is displayed. As part of step 110, a pane is displayed on the display device, the pane is configured as a plurality of rows, each row configured to display characters, wherein a first row of the plurality of rows is a reading row and each other row is a background row. In step 116, the first reading segment is displayed according to a first readability parameter in the location of the reading row as described above with respect to process 400. In step 118 the background segments are displayed in the location of the background rows as described above with reference to process 400 and FIG. 5.

In optional step 120, the reader may use an input device to select a character, word, or words for which the application will present a signifier. The application presents a signifier in response to a request from a reader received via an input device. A reader uses an input device 314 (e.g. a mouse, a joystick, a touchscreen, or other techniques for selecting a word or other character(s) from a line of text) to select word(s) or other character(s). The reader may further use the input device to request that the application provide a signifier for the word or the signifier may be presented automatically upon selection of the word(s) or other character(s). A signifier is generated by the application to provide more information about the selected word or other character(s) to the reader. Such information may include, but is not limited to: an image associated with the word/character(s); an enlarged display of the word/character(s) (to make it easier to read); a definition, antonym, or synonym of the word/character(s); a phonetic depiction of the word/character(s); an audible pronunciation of the word/character(s); and a sound associated with the word/character(s). Display or other presentation of a signifier may be helpful to all readers but may be particularly useful for vision impaired individuals who see a word but do not recognize its meaning. Alternatively, in some cases, individuals may not recognize the word for which the signifier is requested because it is unfamiliar to them. In yet other cases, individuals may have trouble recognizing the words due to a visual impairment. Certain readers may have trouble recognizing a word/character(s) in a line of text due to its visual context, that is, due to the text or other images displayed around the word. For such readers, certain embodiments of the invention provide a mode wherein the selection of a word may be used to generate a new pane which replaces the previous display in a manner that appears to substantially (or completely) cover the pane on which the reading segment was displayed. The new pane displays only the signifier (or an enlarged view of the signifier) for the word which was selected. In certain embodiments the new pane may present a definition or other information for the selected word.

Figure 8A:
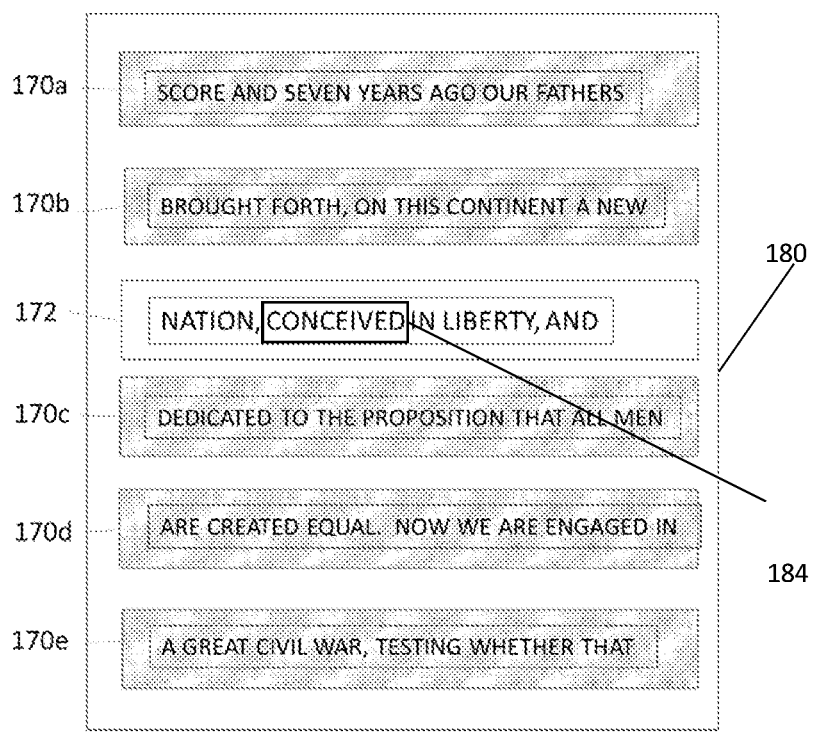
FIG. 8A illustrates the pane of FIG. 5 in a state wherein a word is shown as selected in accordance with an embodiment of the present invention.
Figure 8B:
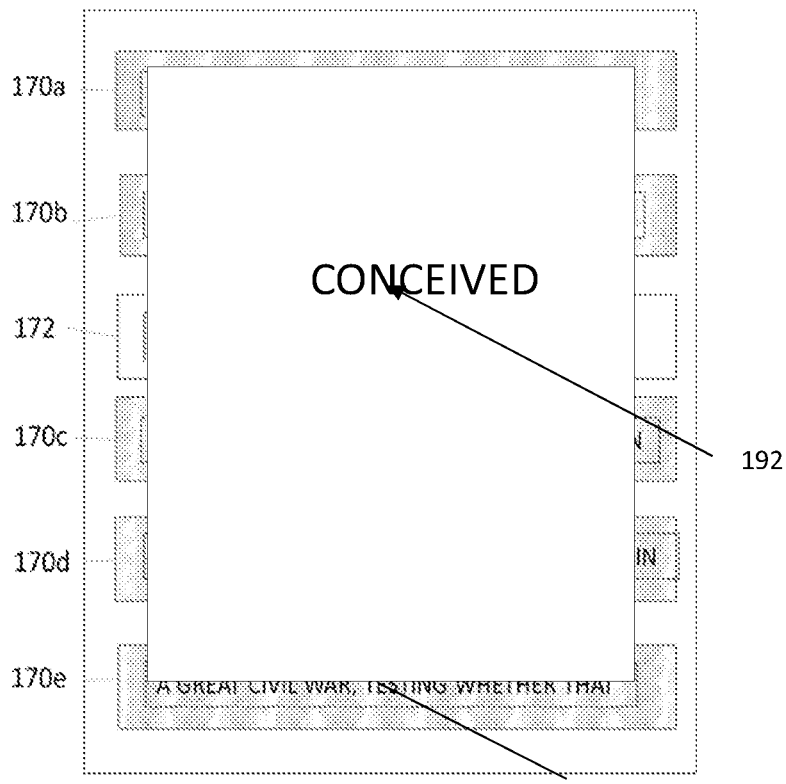
FIG. 8B illustrates the display of a signifier in accordance with one embodiment of the present invention.

FIGS. 8A and 8B illustrate such an embodiment wherein a word "CONCEIVED" 184 within the reading segment 172 of a pane 180 is shown as selected in FIG. 8A and displayed as the word "CONCEIVED" 192 on a new pane 190 which substantially replaces the display of the pane 180 on which CONCEIVED 184 was displayed in a manner in which it appears as if the new pane 190 covers the majority of the prior pane 180. In the embodiment illustrated in FIG. 8b, the word CONCEIVED is displayed as a signifier for the word CONCEIVED. The signifier is presented as enlarged text in a pane that obscures the majority of the previously displayed pane. The signifier provides assistance to the user in reading the word by changing the visual context associated with the word. However, any information associated with the selected word, including without limitation the information discussed above, may be displayed as a signifier in new pane 190 without departing from the scope hereof. Also, in some embodiments, selecting a word causes the application to display an option box to the user. The user may interact with the option box via an input device to select the type of information he or she wishes to see as the signifier. This selection may be made prior to display of pane 190. For example, the user may choose a signifier type such as: enlarged view, definition, pronunciation guidance, or the like, following the choice of signifier type the signifier will be displayed to the user with or without use of a new pane 190.

In step 122, the current reading segment is transitioned to a new reading segment. Step 120 may be performed upon receiving a transition prompt and may include selecting a second one of the plurality of segments to be a second reading segment and selecting others of the plurality of segments to be second background segments. Following the performance of step 120, the program may display the second reading segment according to a first readability parameter in the location of the reading row and display each second background segment according to a second readability parameter in the location of a respective background row.

With regard to step 122, it should be noted that the transition may occur as a result of a transition prompt. In a typical embodiment, following the initial display of the text as described herein, the application may encounter such a transition prompt. A transition prompt is a signal to the application, or from within the application, that indicates that the reader has finished (or should have finished) reading the segment displayed in the reading row.

In accordance with certain embodiments, there are various means of generating a transition prompt as described above with respect to step 122 in process 100. For example, a transition prompt may be generated by a user via a signal generated by an input device or via a menu associated with the computing device. A transition prompt may also be generated by a time report from the processor or the expiration of a timer on the computing device. The expiration of the timer occurs when the time since the previous transition prompt exceeds a time threshold. The time threshold may be a single fixed time for all segments or may, in certain embodiments, be dependent on the particular segment being displayed in the reading row. For example, a segment containing more words or more difficult words (that is, with a higher degree of difficulty of the text) may be associated with a longer time threshold. Such a longer time threshold causes a longer wait before the generation of a transition prompt. Different times associated with particular lines of text may be input by the user, read from the metadata of the file or, in certain embodiments generated by the application based on the reading behavior or ability of the readers.

In an embodiment where the time threshold is determined based on the difficulty of the text in a segment, various techniques may be used to determine the difficulty of the text. For example, certain embodiments may determine the time threshold based on the lexical complexity of a segment, where the lexical complexity may be calculated according to well-known techniques to determine lexical complexity such as those disclosed in: Ai, Haiyang and Lu, Xiaofei (2010). A web-based system for automatic measurement of lexical complexity", Paper presented at the 27th Annual Symposium of the Computer-Assisted Language Consortium (CALICO-10). Amherst, Mass. June 8-12, which is hereby incorporated by reference in its entirety as if fully set forth herein. In another example a time threshold may be calculated based on the readability of the text as characterized according to known techniques such as the Flesch-Kincaid readability test as described in: Izgi, U., Seker, Burcu Sezginsoy; Comparing Different Readability Formulas on the Examples of Science-Technology and Social Science Textbooks. V. 46, 2012, Pgs. 178-182 4th World Conference on Educational Sciences (WCES-2012) 02-05; February 2012, Barcelona, Spain, which is hereby incorporated by reference in its entirety as if fully set forth herein. In an embodiment where the time threshold is calculated based on a reading ability of the application user, the application may determine the reading ability of the reader by accessing data from local memory (which may be stored in an application state file) that indicates the user's reading ability.

Upon detection of the transition prompt, typically the new reading segment is selected as the segment in the text of the content that follows the previous reading segment. Also, typically, the application changes the segment identified as the reading segment to a background segment and identifies a new segment (that is, one of the segments which was previously presented as a background segment) as the reading segment. An example of this is described above with respect to FIGS. 5-7. However, this is not always the case. If the reading row is at the top or bottom of the display device, and depending on the selected scrolling mode and scrolling direction, a reading segment may transition in a manner in which it is no longer displayed. Similarly, a new reading segment may be a segment that was not previously able to be viewed by the reader as a background segment without departing from the scope hereof.

In accordance with certain embodiments of the present disclosure, there may be more than one reading row. For example, although FIG. 5 depicts one reading row, multiple rows may be designated as reading rows and the text of the segments associated with all such rows may be displayed with the readability parameters associated with the reading row (e.g., the first readability parameters). Such embodiments handle the presentation and transition of segments into the reading rows as described above with reference to embodiments wherein there is a single reading row.

In certain embodiments, the readability parameters associated with the text displayed in the location of the background rows may specify that each background row is displayed as visual filler (i.e., the text in the background rows are replaced with other symbols). A readability parameter that indicates that visual filler should be displayed changes the behavior of the application with respect to background rows. It indicates to the application that the characters in each of the words in each segment associated with a background row should be replaced by a particular character (e.g., "*","-","|", or the like), which acts as the visual filler. The role of visual filler characters is to indicate the presence of the words in the background row without actually showing the characters of the text in the background segments. The presentation of visual filler in the background rows acts to obscure the words in the segments presented in the background rows. By displaying visual filler in the background rows, the application indicates to the peripheral vision of the reader the presence of background text (I.e., the text on the background rows), however the characters displayed in the background rows do not distract the eye of the reader by showing the text itself.

For example, a readability parameter associated with a background row may specify that visual filler should be displayed, and in particular that the characters in the text of those segments should be displayed as asterisks. That is, each character in each word should be displayed as an asterisk rather than the actual character in the segment. In such a case, an exemplary background row for a segment that includes the words "able was I ere I saw Elbe" would be displayed as "** * * *** * * **". In certain embodiments, visual filler may be set to be a solid line that extends throughout the width of each background row. Presenting the background rows as visual filler may be helpful to readers who suffer from certain visual impairments. For such readers, visual fillers may provide sufficient visual indicators to trigger the benefits of the reader's visual peripheral response while minimizing visual distraction for readers who are focused on reading the reading row. In summary, although the text displayed in the location of the background rows can spell out the actual words, this is not necessary (as is the case when the background rows are displayed as visual filler) for the engagement of the reader's peripheral vision in a manner that has a positive effect on the reader's reading experience.

It will be appreciated by those skilled in the art that changes could be made to the aspects described above without departing from the broad inventive concept thereof. It is to be understood, therefore, that the subject disclosure is not limited to the particular aspects disclosed, but it is intended to cover modifications within the spirit and scope of the subject disclosure as defined by the appended claims.

I claim:

1. A non-transitory computer readable medium for improving readability of content on a display device, comprising instructions stored thereon, which when executed on a processor, perform the steps of:

organizing the content into a plurality of segments, the content including words and/or characters;

selecting a first of the plurality of segments to be a first reading segment and selecting others of the plurality of segments to be first background segments;

displaying a first pane on the display device, the first pane configured as a plurality of rows displaying the content in the plurality of segments, and wherein a first row of the plurality of rows is a reading row and each other row is a background row;

displaying the first reading segment according to a first readability parameter in the reading row;

displaying each first background segment according to a second readability parameter in a respective background row;

generating a transition prompt and in response to the transition prompt, selecting a second one of the plurality of segments to be a second reading segment and selecting others of the plurality of segments to be second background segments;

displaying the second reading segment according to the first readability parameter in the reading row;

displaying each second background segment according to the second readability parameter in the respective background row;

receiving a selection of a word or character in the first or second reading segments from an input device, presenting a first signifier associated with the selected word or character; and displaying a prompt that indicates an availability of a second signifier associated with the selected word or character, wherein the step of presenting the first signifier for the selected word or character comprises displaying a second pane that obscures the first pane and displays the first signifier.

* * * * *